(12) United States Patent
Wang et al.

(10) Patent No.: US 11,370,041 B2
(45) Date of Patent: Jun. 28, 2022

(54) SLANTING-BED FEED PROCESSING MACHINE TOOL OF LARGE PROPELLER

(71) Applicant: DALIAN UNIVERSITY OF TECHNOLOGY, Liaoning (CN)

(72) Inventors: Yongqing Wang, Liaoning (CN); Tianran Liu, Liaoning (CN); Haibo Liu, Liaoning (CN); Kuo Liu, Liaoning (CN); Te Li, Liaoning (CN); Dongming Guo, Liaoning (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 129 days.

(21) Appl. No.: 17/052,668

(22) PCT Filed: Feb. 28, 2020

(86) PCT No.: PCT/CN2020/077100
§ 371 (c)(1),
(2) Date: Nov. 3, 2020

(87) PCT Pub. No.: WO2021/103334
PCT Pub. Date: Jun. 3, 2021

(65) Prior Publication Data
US 2021/0178535 A1 Jun. 17, 2021

(30) Foreign Application Priority Data
Nov. 29, 2019 (CN) .......................... 201911196016.3

(51) Int. Cl.
*B23Q 1/01* (2006.01)
*B23C 3/18* (2006.01)
(Continued)

(52) U.S. Cl.
CPC ................ *B23C 3/18* (2013.01); *B23C 1/002* (2013.01); *B23Q 1/012* (2013.01); *B23Q 1/015* (2013.01);
(Continued)

(58) Field of Classification Search
CPC ........... Y10T 29/49325; Y10T 29/5109; Y10T 29/5114; Y10T 408/91; Y10T 409/303752;
(Continued)

(56) References Cited

U.S. PATENT DOCUMENTS 4,583,891 A * 4/1986 Eschenfelder ....... B23Q 1/4809
451/280
2005/0186045 A1 * 8/2005 Killer ........................ B23C 3/18
29/27 C
(Continued)

FOREIGN PATENT DOCUMENTS

CN 101357437 A 2/2009
CN 101618511 A 1/2010
(Continued)

OTHER PUBLICATIONS

EPO Machine Translation of CN107520630A—"Horizontal propeller five-shaft linkage digital control processing machine tool, has X shaft transmission mechanism whose outer end is connected with balance mechanism, and X axis drive mechanism connected with double-swing power head", Dec. 29, 2017.*

*Primary Examiner* — Boyer D Ashley
*Assistant Examiner* — Michael Vitale
(74) *Attorney, Agent, or Firm* — Muncy, Geissler, Olds & Lowe, P.C.

(57) ABSTRACT

The present invention relates to a slanting-bed feed processing machine tool of a large propeller. The machine tool comprises a slanting column feed bed, a machine tool
(Continued)

spindle, a workpiece rotary worktable, a large propeller and a bed feed mechanism. The present invention coordinates the geometrical relationship between the machine tool and the large propeller to ensure that the slanting column feed bed moves between two blades, thereby reducing the overhang length of the spindle. Different forms of workpiece rotary worktables and bed feed mechanisms are selected according to different slanting column feed beds. Four types of slanting column feed beds are designed, which can be selected, optimized and applied for different processing objects. The present invention enhances the processing stiffness of the spindle and solves the problem of poor processing quality of the large propeller caused by machine tool vibration.

7 Claims, 7 Drawing Sheets

(51) Int. Cl.
  *B23Q 5/40* (2006.01)
  *B23C 1/14* (2006.01)
  *B23Q 5/28* (2006.01)
  *B23Q 5/10* (2006.01)
  *B23C 1/00* (2006.01)

(52) U.S. Cl.
  CPC ................ *B23Q 5/10* (2013.01); *B23Q 5/28* (2013.01); *B23Q 5/40* (2013.01); *B23C 1/14* (2013.01); *B23C 2215/045* (2013.01)

(58) Field of Classification Search
  CPC . Y10T 409/303808; Y10T 409/307672; Y10T 409/307728; Y10T 409/308232; Y10T 409/308512; Y10T 409/309576; B23C 1/002; B23C 1/012; B23C 1/14; B23C 3/18; B23C 2215/045; B23C 2215/12; B23C 2215/44; B23C 2215/56; B23B 39/006; B23Q 5/10; B23Q 5/28; B23Q 5/40
  USPC .......... 29/27 R, 27 C, 889.23; 409/131, 132, 409/201, 202, 211, 216, 235; 408/234
  See application file for complete search history.

(56) References Cited

U.S. PATENT DOCUMENTS

| | | | |
|---|---|---|---|
| 2006/0159540 A1* | 7/2006 | Motta | ................ B23Q 11/0003 409/235 |
| 2009/0123246 A1* | 5/2009 | Matsui | ................ B23Q 1/4852 409/201 |

FOREIGN PATENT DOCUMENTS

| | | | | |
|---|---|---|---|---|
| CN | 101623821 A | | 1/2010 | |
| CN | 102744448 A | | 10/2012 | |
| CN | 104014983 A | | 9/2014 | |
| CN | 107520630 A | | 12/2017 | |
| CN | 108453518 A | | 8/2018 | |
| CN | 110315427 A | | 10/2019 | |
| DE | 2329235 A | * | 12/1974 | ............ B23C 3/18 |
| EP | 0424815 A1 | | 5/1991 | |
| EP | 1129813 A1 | * | 9/2001 | ............ B23C 3/18 |
| GB | 2269768 A | | 2/1994 | |
| SU | 421437 A | * | 8/1974 | ............ B23C 3/18 |
| SU | 610618 A | * | 5/1978 | |
| WO | WO-0051779 A2 | * | 9/2000 | ............ B23Q 1/012 |
| WO | WO-2020192058 A1 | * | 10/2020 | ............ B23C 3/18 |

\* cited by examiner

SLANTING-BED FEED PROCESSING MACHINE TOOL OF LARGE PROPELLER

TECHNICAL FIELD

The present invention belongs to the technical field of CNC machine tools, and relates to a slanting-bed feed processing machine tool of a large propeller.

BACKGROUND

The large propeller is one of core components of a ship power system. Its manufacturing quality directly determines the propulsion efficiency, maneuverability, vibration characteristics and safety of a ship. However, the shape of blades is a three-dimensional helical curved surface, which makes the process of the propeller complicated during processing and makes the propeller difficult to manufacture. A traditional semi-mechanized processing method has low efficiency, poor accuracy and high labor intensity, and seriously restricts the processing accuracy of the large propeller. Especially in a hub and a blade root, because of large blade diameter, even a numerical control processing method can only ensure the processing integrity by increasing the overhang length of a spindle.

However, the stiffness of a process system is closely related to the overhang length of the spindle. The increase of the overhang length of the spindle greatly reduces the stiffness. Especially in the process of high-feed milling or grinding, low system stiffness easily causes the spindle to deform, and cannot ensure the processing quality of the large propeller under the action of a large cutting force. Therefore, in order to make the spindle component of a machining lathe have high stiffness, small vibration, small deformation, low noise and good dynamic performance against forced vibration and self-excited vibration, the geometrical relationship between the machine tool and the large propeller is coordinated through the innovative design of the device to ensure that a slanting column feed bed moves between two blades, thereby reducing the overhang length of the spindle, enhancing the system stiffness and realizing high quality processing for the large propeller.

In 2010, Zhao Hu et al. disclosed a six-axis five-linkage propeller processing center in the invention patent CN200910038368.6. The device is composed of a front base, a rear base, an X-direction slide plate, a column, a Y-direction slide plate, and the like, to realize stable processing of the large propeller. However, motion mechanisms of the device are numerous and complicated, making it difficult to ensure the processing accuracy and quality. In addition, the propeller axis needs to be parallel to the ground during processing, making it difficult to operate. In 2014, Zhou Junwei et al. disclosed a method for processing a ducted propeller in the invention patent CN201410231006.X. The method adopts a multi jaw chuck to clamp the outer cylindrical surface of a blank, and a clamping plate clamps and fixes a blade crown, so that the blade is in a multi-point fixed state to enhance the stiffness. A special fixture of the propeller is designed to ensure the processing stiffness.

However, the above methods do not mention a slanting-bed feed processing machine tool of the large propeller.

SUMMARY

The present invention mainly solves the technical problem of overcoming the defects of the existing methods, and invents a slanting-bed feed processing machine tool of a large propeller with respect to the needs of high quality processing of the large propeller. In the machine tool, a slanting column feed bed is innovatively designed, which effectively reduces the overhang length of a spindle, ensures the processing stiffness, and solves the problem of poor processing quality of the large propeller caused by machine tool vibration. The designed feed processing machine tool has excellent stability and compact structure, and effectively reduces the floor space. The feed processing machine tool has 4 degrees of freedom, which avoids the coupling error caused by multi-axis control and ensures the processing accuracy of parts.

To achieve the above purpose, the present invention adopts the following technical solution:

A slanting-bed feed processing machine tool of a large propeller comprises a slanting column feed bed 1, a machine tool spindle 2, a workpiece rotary worktable 3, a large propeller 4 and a bed feed mechanism 5, wherein the slanting column feed bed 1 comprises two types: a vertical slanting column feed bed and an inverted slanting column feed bed; the workpiece rotary worktable 3 comprises two types: a workpiece rotary worktable form A and a workpiece rotary worktable form B; and the bed feed mechanism 5 comprises two types: a floor type feed mechanism and a gantry type feed mechanism. Different forms of workpiece rotary worktable 3 and bed feed mechanism 5 are selected according to different types of slanting column feed bed 1.

Figure 5:
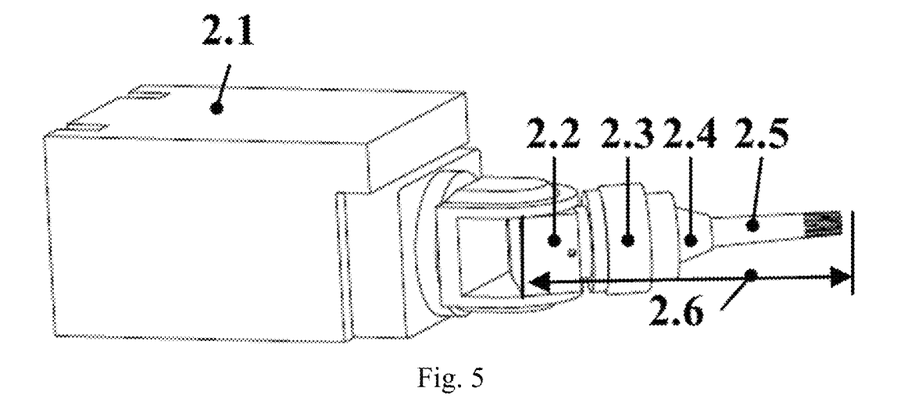
FIG. 5 is a diagram of a machine tool spindle.

When the slanting column feed bed 1 is the vertical slanting column feed bed, the workpiece rotary worktable 3 is the workpiece rotary worktable form A and the bed feed mechanism 5 is the floor type feed mechanism, specifically:

The machine tool spindle 2 comprises a swing motor 2.1, a spindle motor 2.2, a spindle 2.3, a shank 2.4 and a cutter 2.5. The machine tool spindle 2 is controlled to slide up and down along a linear guide rail 1.3 through a linear motor 1.4 and a lead screw 1.5. The swing motor 2.1 is located in a large square groove 1.8 of the slanting column feed bed 1, and controls the spindle 2.3 to swing around the slanting column feed bed 1 to ensure that the cutter 2.5 can process a hub 4.1, a blade root 4.4.3 at a blade surface and a blade root 4.4.4 at a blade back; The spindle motor 2.2 drives the shank 2.4 and the cutter 2.5 to rotate, so as to process the blade root 4.4 at high efficiency.

Figure 8:
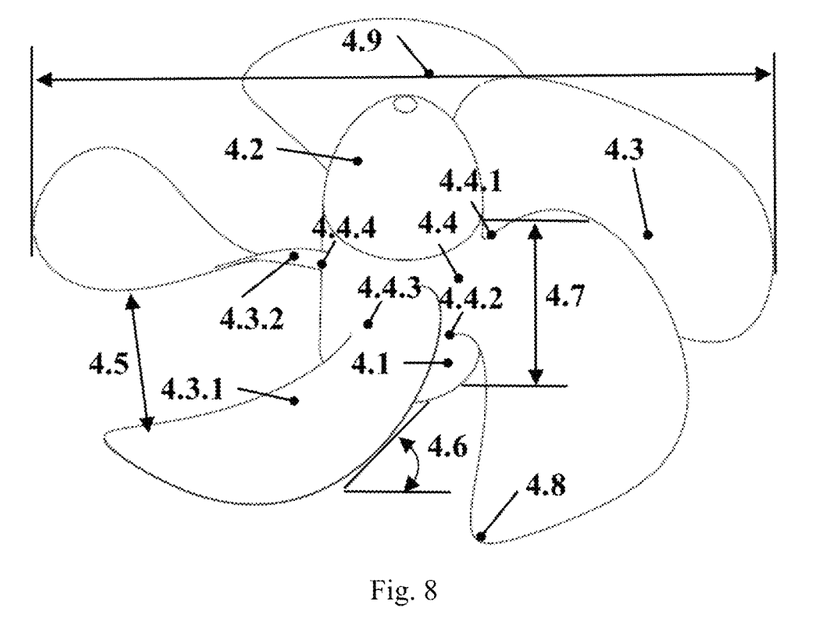
FIG. 8 is a diagram of a large propeller.

The large propeller 4 comprises the hub 4.1, a hub cap 4.2, blades 4.3 and the blade root 4.4, wherein each blade 4.3 also comprises a blade surface 4.3.1 and a blade back 4.3.2; and the large propeller 4 has a three-dimensional helical curved surface and a large diameter, and generates thrust during underwater rotation. The hub 4.1 is used to fix and combine each blade 4.3. The hub cap 4.2 is generally added on the top end of the hub 4.1 to reduce water resistance. The blade root 4.4 is a connecting part of the blade 4.3 and the hub 4.1. To reduce the concentrated stress at the blade root 4.4, the blade root 4.4 needs to be processed to a fillet.

Figure 1:
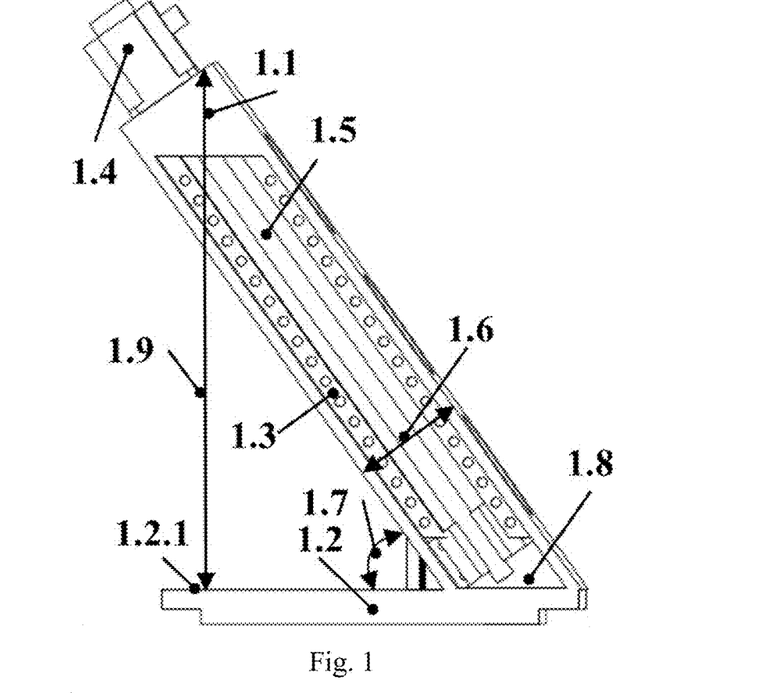
FIG. 1 is an example (I) diagram of a slanting column feed bed.
Figure 2:
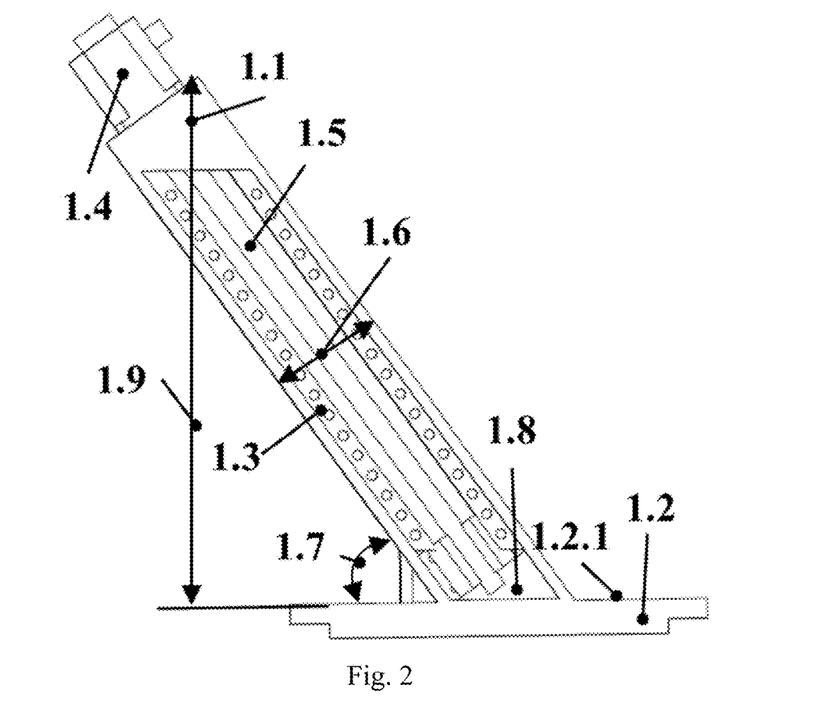
FIG. 2 is an example (II) diagram of a slanting column feed bed.
Figure 3:
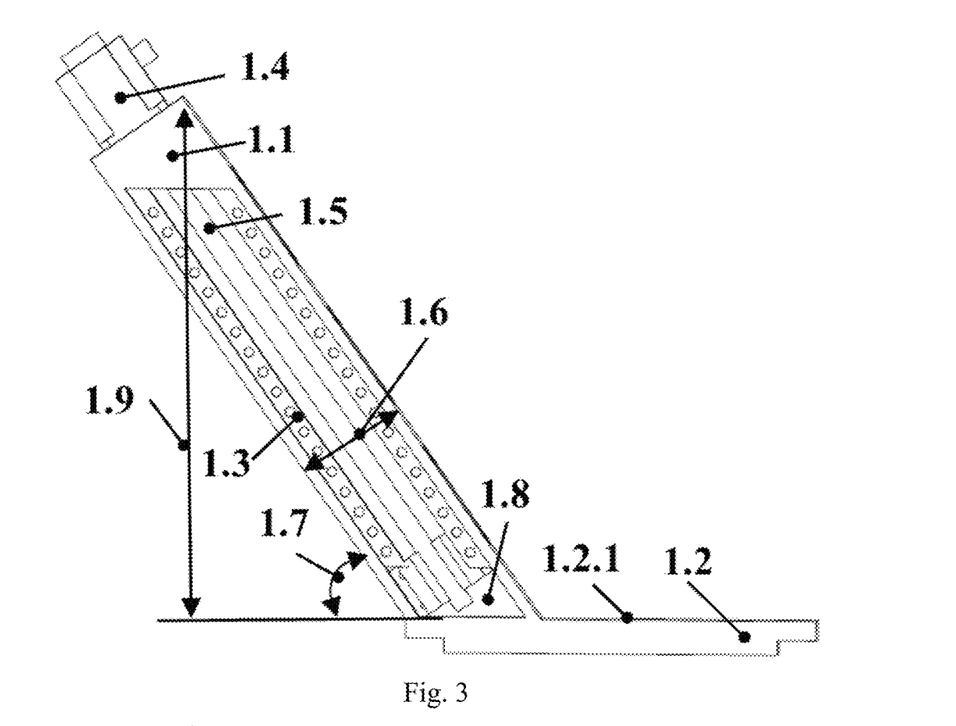
FIG. 3 is an example (III) diagram of a slanting column feed bed.

The vertical slanting column feed bed comprises a slanting column 1.1, a base bed 1.2, the linear guide rail 1.3, the linear motor 1.4, the lead screw 1.5 and the large square groove 1.8. In order to ensure that the slanting column 1.1 does not interfere with the blades 4.3 in a feed process, a distance 4.5 between two blades is larger than the width 1.6 of the slanting column, and the slanting angle 1.7 of the slanting column shall be adapted to a deflection angle 4.6 of the blade back. In order to achieve high-quality processing of the large propeller 4, the large square groove 1.8 is also formed at one side of the slanting column 1.1. The height 1.9 of the slanting column cannot be lower than the height 4.7 of the hub; otherwise, a small stroke length cannot ensure the processing integrity of the top end 4.4.1 and the bottom end 4.4.2 of the blade root. The slanting angle 1.7 exists between the slanting column 1.1 and the base bed 1.2.

Figure 6:
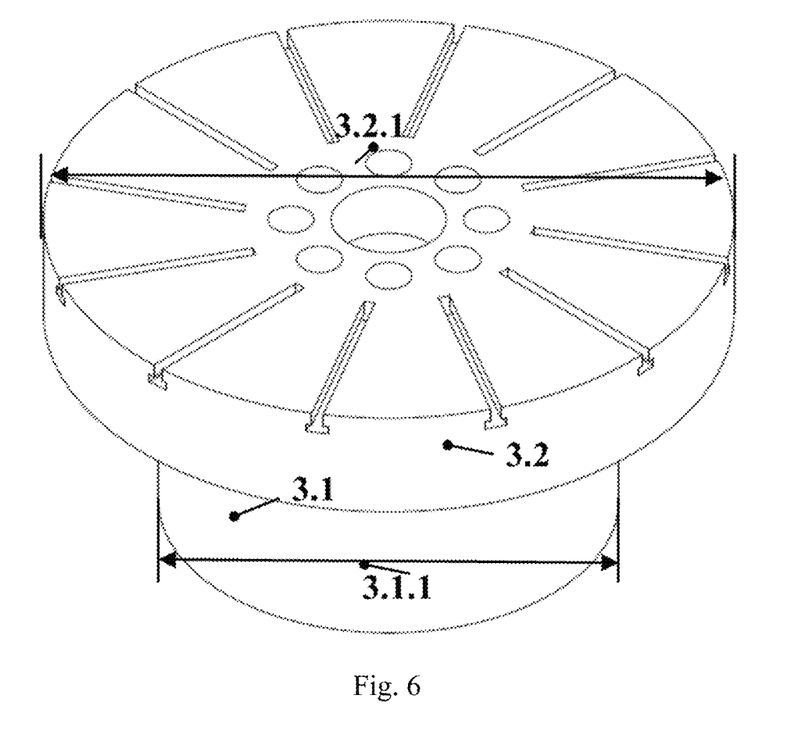
FIG. 6 is an example (I) diagram of a workpiece rotary worktable.

The workpiece rotary worktable form A comprises a circular base 3.1 and a rotary worktable 3.2. While the circular base 3.1 plays a supporting role, the circular base 3.1 also provides good vibration isolation services for the rotation of the large propeller 4; especially the diameter 3.1.1 of the circular base is smaller than the diameter 3.2.1 of the rotary worktable; and when the large propeller 4 is located on the workpiece rotary worktable form A, the bottom end 4.8 of the blade is higher than an upper surface 1.2.1 of the base bed to ensure that the vertical slanting column feed bed is as close to the hub 4.1 as possible, thereby effectively reducing the overhang length 2.6 of the spindle.

Figure 9:
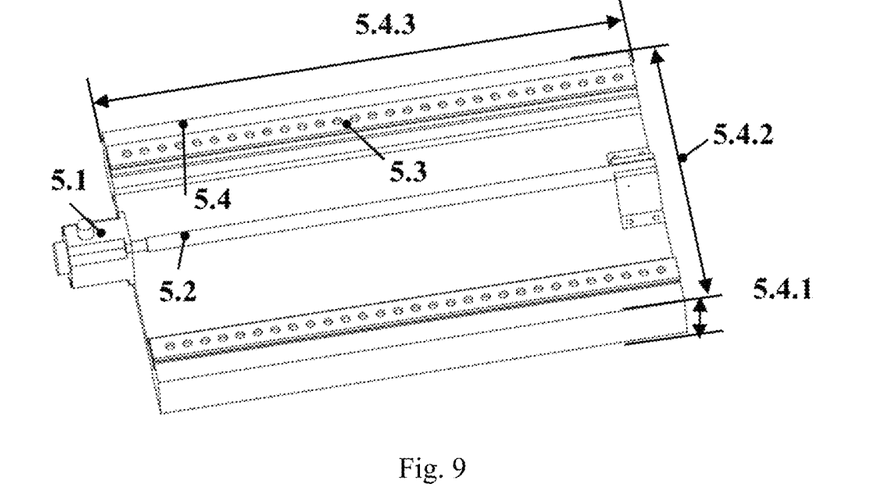
FIG. 9 is an example (I) diagram of a bed feed mechanism.

The floor type feed mechanism comprises a linear motor 5.1, a lead screw 5.2, a guide rail 5.3 and a worktable 5.4. The vertical slanting column feed bed slides on the worktable 5.4 along the guide rail 5.3 through the linear motor 5.1 and the lead screw 5.2. The height 5.4.1 of the worktable is designed to ensure that the upper surface 1.2.1 of the base bed does not interfere with the blade 4.3.

Further, considering that the weight of the slanting column 1.1 is large and the center of gravity of the slanting column 1.1 is not on the axis of the column because of the existence of the slanting angle 1.7, in order to prevent the vertical slanting column feed bed from tipping over, the weight of the base bed 1.2 is increased and meanwhile, a groove needs to be formed at the other side of the slanting column 1.1 to reduce the weight of the slanting column 1.1 and save materials.

Further, the vertical slanting column feed bed comprises three forms: a right slanting L type column feed bed, a slanting T type column feed bed and a left slanting L type column feed bed; the three forms have the same structural components, but the difference is the position of the slanting column 1.1 on the base bed 1.2: when the slanting column 1.1 is on the rightmost side of the base bed 1.2, the vertical slanting column feed bed is the right slanting L type column feed bed; when the slanting column 1.1 is on the leftmost side of the base bed 1.2, the vertical slanting column feed bed is the left slanting L type column feed bed; and when the slanting column 1.1 is in any position of the middle of the base bed 1.2, the vertical slanting column feed bed is the slanting T type column feed bed.

When the slanting column feed bed 1 is the inverted slanting column feed bed, the workpiece rotary worktable 3 is the workpiece rotary worktable form B and the bed feed mechanism 5 is the gantry type feed mechanism, specifically:

The machine tool spindle 2 comprises a swing motor 2.1, a spindle motor 2.2, a spindle 2.3, a shank 2.4 and a cutter 2.5. The machine tool spindle 2 is controlled to slide up and down along a linear guide rail 1.3 through a linear motor 1.4 and a lead screw 1.5. The swing motor 2.1 is located in a large square groove 1.8 of the slanting column feed bed 1, and controls the spindle 2.3 to swing around the slanting column feed bed 1 to ensure that the cutter 2.5 can process a hub 4.1, a blade root 4.4.3 at a blade surface and a blade root 4.4.4 at a blade back; The spindle motor 2.2 drives the shank 2.4 and the cutter 2.5 to rotate, so as to process the blade root 4.4 at high efficiency.

The large propeller 4 comprises the hub 4.1, a hub cap 4.2, blades 4.3 and the blade root 4.4, wherein each blade 4.3 also comprises a blade surface 4.3.1 and a blade back 4.3.2; and the large propeller 4 has a three-dimensional helical curved surface and a large diameter, and generates thrust during underwater rotation. The hub 4.1 is used to fix and combine each blade 4.3. The hub cap 4.2 is generally added on the top end of the hub 4.1 to reduce water resistance. The blade root 4.4 is a connecting part of the blade 4.3 and the hub 4.1. To reduce the concentrated stress at the blade root 4.4, the blade root 4.4 needs to be processed to a fillet.

Figure 4:
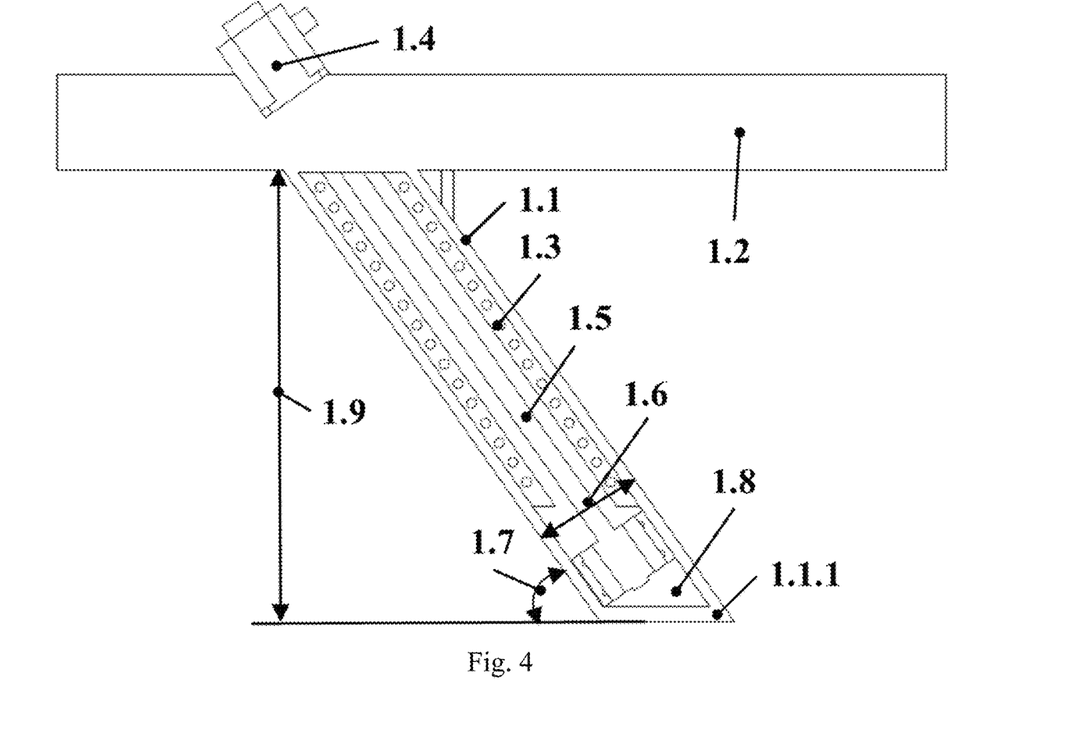
FIG. 4 is an example (IV) diagram of a slanting column feed bed.

The inverted slanting column feed bed comprises a slanting column 1.1, a base bed 1.2, the linear guide rail 1.3, the linear motor 1.4, the lead screw 1.5 and the large square groove 1.8. In order to ensure that the slanting column 1.1 does not interfere with the blades 4.3 in a feed process, a distance 4.5 between two blades shall be larger than the width 1.6 of the slanting column, and the slanting angle 1.7 of the slanting column shall be adapted to a deflection angle 4.6 of the blade back. In order to achieve high-quality processing of the large propeller 4, the large square groove 1.8 is also formed at one side of the slanting column 1.1. The height 1.9 of the slanting column cannot be lower than the height 4.7 of the hub; otherwise, a small stroke length cannot ensure the processing integrity of the top end 4.4.1 and the bottom end 4.4.2 of the blade root.

Figure 7:
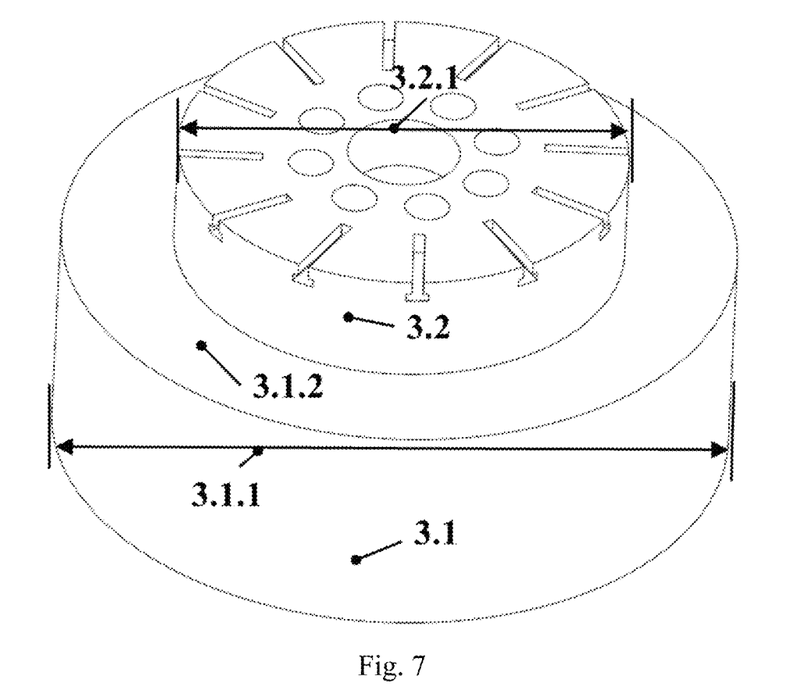
FIG. 7 is an example (II) diagram of a workpiece rotary worktable.

The workpiece rotary worktable form B comprises a circular base 3.1 and a rotary worktable 3.2. While the circular base 3.1 plays a supporting role, the circular base 3.1 also provides good vibration isolation services for the rotation of the large propeller 4; especially the diameter 3.1.1 of the circular base is larger than the diameter 3.2.1 of the rotary worktable; and the upper surface 3.1.2 of the circular base is lower than the bottom end 1.1.1 of the slanting column to ensure that the vertical slanting column feed bed is as close to the hub 4.1 as possible, thereby effectively reducing the overhang length 2.6 of the spindle.

Figure 10:
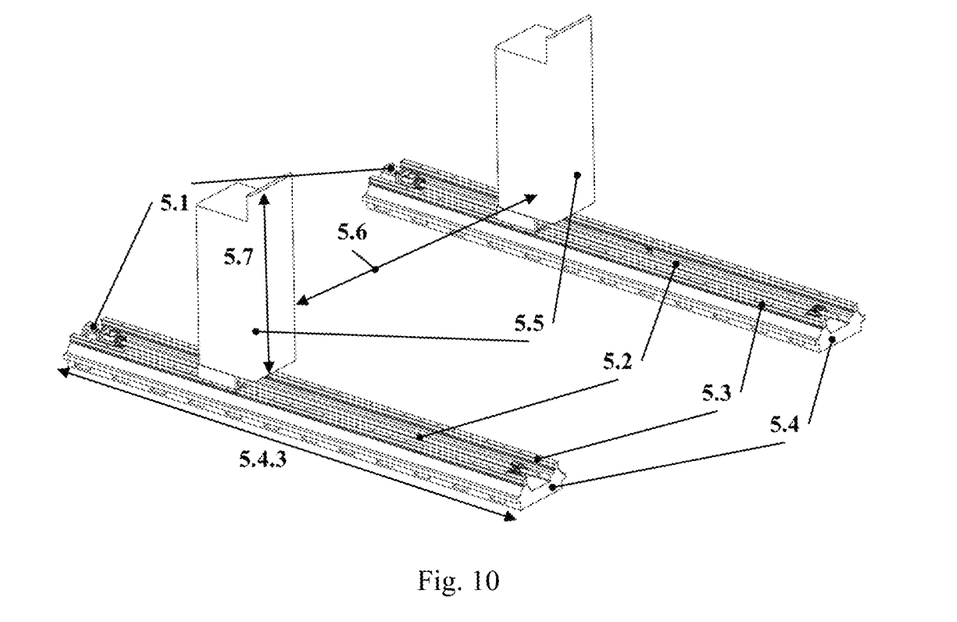
FIG. 10 is an example (II) diagram of a bed feed mechanism.
Figure 11:
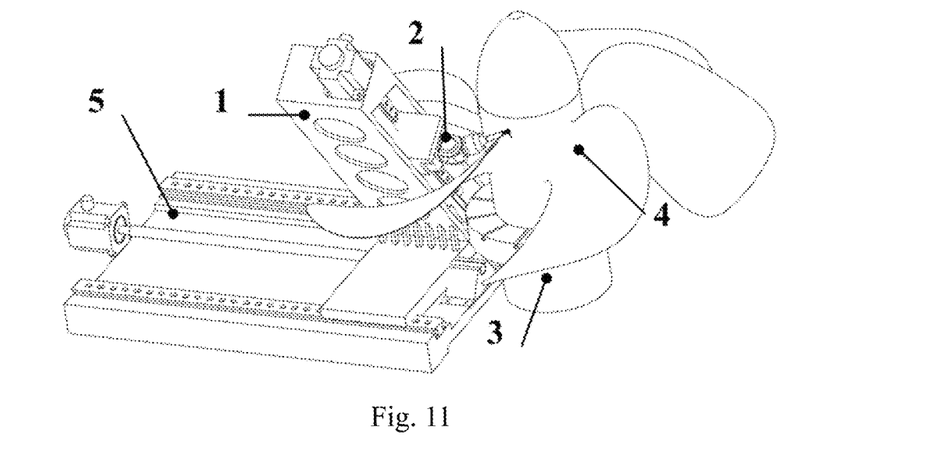
FIG. 11 is an example (I) diagram of a slanting-bed feed processing machine tool.
Figure 12:
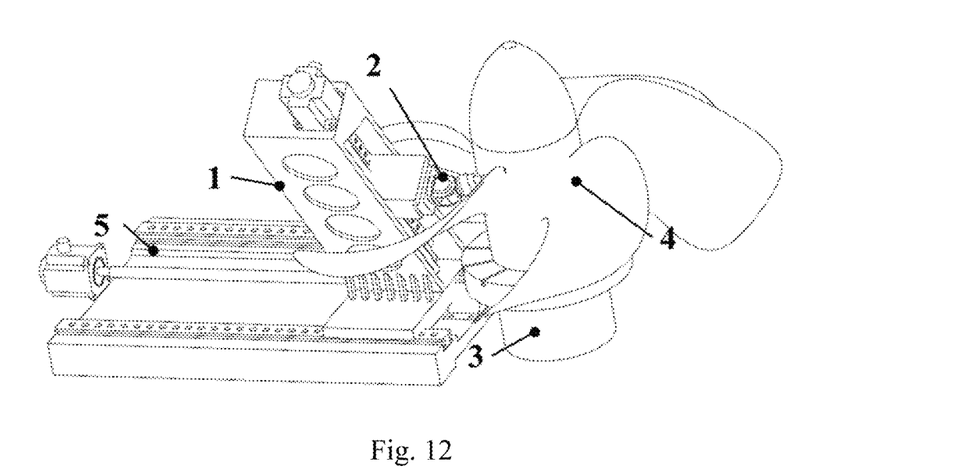
FIG. 12 is an example (II) diagram of a slanting-bed feed processing machine tool.
Figure 13:
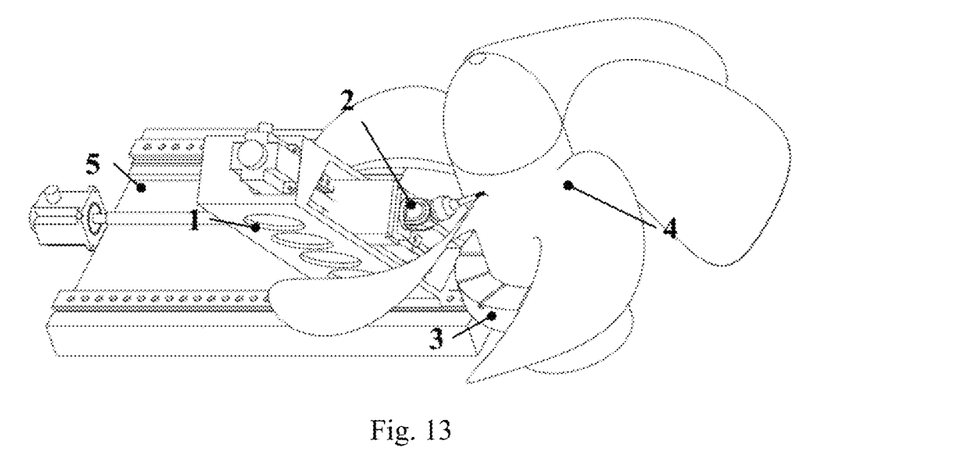
FIG. 13 is an example (III) diagram of a slanting-bed feed processing machine tool.
Figure 14:
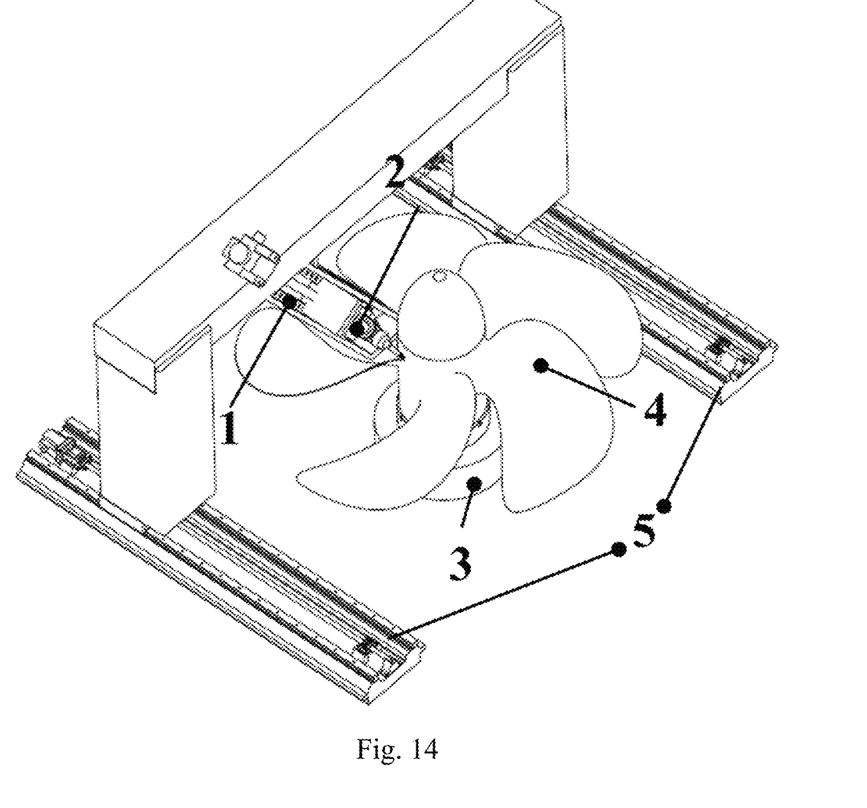
FIG. 14 is an example (IV) diagram of a slanting-bed feed processing machine tool.

The gantry type feed mechanism comprises a linear motor 5.1, a lead screw 5.2, a guide rail 5.3, a worktable 5.4 and columns 5.5. The inverted slanting column feed bed slides on the worktable 5.4 along the guide rail 5.3 through the linear motor 5.1 and the lead screw 5.2. The columns 5.5 for supporting the inverted slanting column feed bed are added; a distance 5.6 between the columns is larger than the diameter 4.9 of the large propeller; and the height 5.7 of the columns is larger than the total height 4.10 of the large propeller to prevent the inverted slanting column feed bed from colliding with the hub cap 4.2 and the blade 4.3 during sliding along the guide rail 5.3.

Further, considering that the weight of the slanting column 1.1 is large, in order to increase the stability of the inverted slanting column feed bed, the weight of the base bed 1.2 is increased and meanwhile, a groove needs to be formed at the other side of the slanting column 1.1 to reduce the weight of the slanting column 1.1 and save materials.

The present invention has the beneficial effects: the slanting-bed feed processing machine tool of the large propeller is established, which effectively reduces the overhang length of the spindle, ensures the processing stiffness, and solves the problem of poor processing quality of the large propeller caused by poor stiffness of the spindle. The innovative design of the slanting column feed bed effectively reduces the floor space of the machine tool, makes the structure compact and increases the material utilization rate. The designed slanting-bed feed processing machine tool has 4 degrees of freedom, which avoids the coupling error caused by multi-axis control, realizes high quality processing of the parts and satisfies high quality processing requirements for the large propeller.

In the figures: 1 slanting column feed beds (four); 2 machine tool spindle; 3 workpiece rotary worktables (two); 4 large propeller; 5 bed feed mechanisms (two).

1.1 Slanting column; 1.2 base bed; 1.3 linear guide rail; 1.4 linear motor; 1.5 lead screw; 1.6 width of slanting column; 1.7 slanting angle of slanting column; 1.8 large square groove; 1.9 height of slanting column; 1.1.1 bottom end of slanting column; 1.2.1 upper surface of base bed.

2.1 Swing motor; 2.2 spindle motor; 2.3 spindle; 2.4 shank; 2.5 cutter; 2.6 overhang length of spindle.

3.1 Circular base; 3.2 rotary worktable; 3.1.1 diameter of circular base; 3.1.2 upper surface of circular base; 3.2.1 diameter of rotary worktable.

4.1 Hub; 4.2 hub cap; 4.3 blade; 4.4 blade root; 4.5 distance between two blades; 4.6 deflection angle of blade back; 4.7 height of hub; 4.8 bottom end of blade; 4.9 diameter of propeller; 4.3.1 blade surface; 4.3.2 blade back; 4.4.1 top end of blade root; 4.4.2 bottom end of blade root.

5.1 Linear motor; 5.2 lead screw; 5.3 guide rail; 5.4 worktable; 5.5 column; 5.6 distance between columns; 5.7 height of column; 5.4.1 worktable height; 5.4.2 worktable width; 5.4.3 worktable length.

DETAILED DESCRIPTION

Specific embodiments of the present invention are described in detail in combination with the drawings.

Different types of workpiece rotary worktables 3 and bed feed mechanisms 5 are selected according to different slanting column feed beds 1. Four types of a vertical right slanting L type bed feed processing machine tool, a vertical slanting T type bed feed processing machine tool, a vertical left slanting L type bed feed processing machine tool and an inverted slanting bed feed processing machine tool are designed.

In the embodiments, a large propeller 4 is generally a four-blade propeller or five-blade propeller, and the five-blade propeller has a smaller distance 4.5 between two blades relative to the four-blade propeller and is more difficult to manufacture and process. Therefore, taking the large propeller 4 with five blades 4.3 as a processing object, in order to enhance the stiffness and corrosion resistance of the large propeller 4, the material is bronze; the diameter of the hub 4.1 is 762 mm; the height is 930 mm; the diameter 4.9 of the propeller is 3500 mm; and the distance 4.5 between two blades is 700 mm.

Embodiment 1

When the selected slanting column feed bed 1 is the vertical slanting column feed bed, the workpiece rotary worktable 3 is a workpiece rotary worktable form A and the bed feed mechanism 5 is a floor type feed mechanism. Based on the moment balance principle, compared with the slanting T type column feed bed and the left slanting L type column feed bed, the right slanting L type column feed bed is more difficult to tip over, has better stability and can ensure the processing quality of the large propeller 4. Therefore, relative to the vertical slanting column feed bed, the right slanting L type column feed bed is preferably selected, which has small floor space and large material utilization rate and can achieve the high quality processing for the blade root of the large propeller 4. The right slanting L type column feed bed has a width 1.6 of slanting column of 470 mm, slanting angle 1.7 of slanting column of 55° and height 1.9 of slanting column of 1800 mm.

The workpiece rotary worktable uses the workpiece rotary worktable form A having the diameter 3.1.1 of the circular base smaller than the diameter 3.2.1 of the rotary worktable; the diameter 3.1.1 of the circular base is 800 mm; and the diameter 3.2.1 of the rotary worktable is 1200 mm. The bed feed mechanism is the floor type feed mechanism. The worktable height 5.4.1 is 250 mm, the worktable width 5.4.2 is 2000 mm and the worktable length 5.4.3 is 3000 mm so as to ensure that the worktable 5.4 can be as close to the hub 4.1 as possible and still has enough stroke length to enable the right slanting L type column feed bed to withdraw from the blades 4.3; and the bottom end 4.8 of the blade is higher than the upper surface 1.2.1 of the base bed of the right slanting L type column feed bed to avoid interference.

Embodiment 2

When the selected slanting column feed bed 1 is the inverted slanting column feed bed, the workpiece rotary worktable 3 is a workpiece rotary worktable form B and the bed feed mechanism 5 is a gantry type feed mechanism. Compared with the vertical slanting column feed bed, the inverted slanting column feed bed is supported by columns 5.5 and thus may not tip over due to the existence of the slanting angle 1.7 of the slanting columns. However, the inverted slanting column feed bed requires more materials, and the assembled inverted slanting-bed feed processing machine tool has more floor space. Because the large propeller 4 processed in the embodiments has the same dimension parameters, the inverted slanting column feed bed and the vertical slanting column feed bed have the same dimension parameters of the slanting column 1.1. The width 1.6 is 470 mm, the slanting angle 1.7 of the slanting column is 55° and the height 1.9 of the slanting column is 1800 mm.

The workpiece rotary worktable uses the workpiece rotary worktable form B having the diameter 3.1.1 of the circular base larger than the diameter 3.2.1 of the rotary worktable; the diameter 3.1.1 of the circular base is 1200 mm; and the diameter 3.2.1 of the rotary worktable is 800 mm. The bed feed mechanism is the gantry type feed mechanism. The distance 5.6 between the columns is 3900 mm, the height 5.7 of the column is 2100 mm and the worktable length 5.4.3 is 4000 mm so as to ensure that the slanting column 1.1 can be as close to the hub 4.1 as possible and still has enough stroke length to enable the inverted slanting column feed bed to withdraw from the blades 4.3.

The purpose of the innovative design of the slanting-bed feed processing machine tool of the large propeller 4 is to reduce the overhang length 2.6 of the spindle to increase the processing stiffness, so as to ensure the high-quality and high efficiency processing of the blade root 4.4 of the large propeller 4. Based on the main parameters of the slanting column 1.1 of the right slanting L type column feed bed and the inverted slanting column feed bed of the large propeller 4, the overhang length 2.6 of the spindle may be less than 400 mm to satisfy high quality processing requirements for the large propeller.

The slanting-bed feed processing machine tool of the large propeller proposed by the present invention effectively reduces the overhang length of the spindle, ensures the processing stiffness, and solves the problem of poor processing quality of the large propeller caused by machine tool vibration. Four different structural forms of slanting-bed feed processing machine tools are designed, which can be selected, optimized and applied for different processing objects. Especially, the right slanting L type vertical bed feed processing machine tool has excellent stability and compact structure, and effectively reduces the floor space of a factory building. The designed processing machine tool has 4 degrees of freedom, which avoids the coupling error caused by multi-axis control, realizes the processing accuracy of the parts and satisfies high quality processing requirements for the large propeller.

The above embodiments only express the implementation of the present invention, and shall not be interpreted as a limitation to the scope of the patent for the present invention. It should be noted that, for those skilled in the art, several variations and improvements can also be made without departing from the concept of the present invention, all of which belong to the protection scope of the present invention.

The invention claimed is:

1. A slanting-bed feed processing machine tool of a propeller, the slanting-bed feed processing machine tool comprising a slanting column feed bed (1), a machine tool spindle (2), a workpiece rotary worktable (3), a propeller (4) and a bed feed mechanism (5), wherein the slanting column feed bed (1) is a vertical slanting column feed bed, the workpiece rotary worktable (3) is a workpiece rotary worktable having a first form, and the bed feed mechanism (5) is a floor type feed mechanism, and wherein:

the machine tool spindle (2) comprises a swing motor (2.1), a spindle motor (2.2), a spindle (2.3), a shank (2.4), and a cutter (2.5); the machine tool spindle (2) is controlled to slide up and down along a linear guide rail (1.3) through a linear motor (1.4) and a lead screw (1.5); the swing motor (2.1) is located in a square groove (1.8) of the slanting column feed bed (1), and controls the spindle (2.3) to swing around the slanting column feed bed (1) to ensure that the cutter (2.5) can process a hub (4.1), a blade root (4.4.3) at a blade surface, and a blade root (4.4.4) at a blade back; the spindle motor (2.2) drives the shank (2.4) and the cutter (2.5) to rotate about a first axis of rotation to process the blade root (4.4);

the propeller (4) comprises the hub (4.1), blades (4.3), and the blade root (4.4); the hub (4.1) is used to fix and combine each of the blades (4.3); and the blade root (4.4) is a connector of the blades (4.3) and the hub (4.1);

the vertical slanting column feed bed comprises a slanting column (1.1), a base bed (1.2), the linear guide rail (1.3), the linear motor (1.4), the lead screw (1.5), and the square groove (1.8); a distance (4.5) between two adjacent blades (4.3.1, 4.3.2) of the blades (4.3) is larger than the width (1.6) of the slanting column to ensure that the slanting column (1.1) does not interfere with the blades (4.3) in a feed process; the square groove (1.8) is formed at a first side of the slanting column (1.1) to achieve processing of the propeller (4); an oblique slanting angle (1.7) extends from a longitudinal axis of the slanting column (1.1) to an upper surface (1.2.1) of the base bed (1.2), and the slanting angle (1.7) of the slanting column is adapted to a deflection angle (4.6) of the blade back; wherein the longitudinal axis of the slanting column (1.1) extends parallel to the linear guide rail (1.3) of the slanting column (1.1); and a height of the slanting column (1.1) cannot be lower than a height of the hub (4.1) to ensure the processing integrity of a top end (4.4.1) and a bottom end (4.4.2) of the blade root;

the workpiece rotary worktable having the first form comprises a circular base (3.1) and a rotary worktable (3.2); wherein the circular base (3.1) plays a supporting role and the circular base (3.1) also provides vibration isolation services for rotation of the propeller (4) about a second axis of rotation; the diameter (3.1.1) of the circular base is smaller than the diameter (3.2.1) of the rotary worktable; and when the propeller (4) is located on the workpiece rotary worktable having the first form, a bottom end (4.8) of a given one of the blades (4.3) is higher than the upper surface (1.2.1) of the base bed (1.2) to ensure that the vertical slanting column feed bed is close to the hub (4.1), thereby effectively reducing an overhang length (2.6) of the spindle; and the floor type feed mechanism comprises a linear motor (5.1), a lead screw (5.2), a guide rail (5.3), and a worktable (5.4); the vertical slanting column feed bed slides on the worktable (5.4) along the guide rail (5.3) through the linear motor (5.1) and the lead screw (5.2); and a height (5.4.1) of the worktable (5.4) is such that the upper surface (1.2.1) of the base bed (1.2) does not interfere with the given one of the blades (4.3).

2. The slanting-bed feed processing machine tool of the propeller according to claim 1, wherein the vertical slanting column feed bed comprises three forms: a right slanting L type column feed bed, a slanting T type column feed bed, and a left slanting L type column feed bed; the three forms have the same structural components, but the difference between the three forms is the position of the slanting column (1.1) on the base bed (1.2):

when the slanting column (1.1) is on the rightmost side of the base bed (1.2), the vertical slanting column feed bed is the right slanting L type column feed bed;

when the slanting column (1.1) is on the leftmost side of the base bed (1.2), the vertical slanting column feed bed is the left slanting L type column feed bed; and when the slanting column (1.1) is in any position of the middle of the base bed (1.2), the vertical slanting column feed bed is the slanting T type column feed bed.

3. The slanting-bed feed processing machine tool of the propeller according to claim 1, wherein a further groove is formed at a second side of the slanting column (1.1).

4. The slanting-bed feed processing machine tool of the propeller according to claim 1, wherein a hub cap (4.2) is added on a top end of the hub (4.1) of the propeller (4) to reduce water resistance.

5. A slanting-bed feed processing machine tool of a propeller, the slanting-bed processing machine tool comprising a slanting column feed bed (1), a machine tool spindle (2), a workpiece rotary worktable (3), a propeller (4), and a bed feed mechanism (5), wherein the slanting column feed bed (1) is an inverted slanting column feed bed, the workpiece rotary worktable (3) is a workpiece rotary worktable having a second form, and the bed feed mechanism (5) is a gantry type feed mechanism, and wherein:

the machine tool spindle (2) comprises a swing motor (2.1), a spindle motor (2.2), a spindle (2.3), a shank (2.4), and a cutter (2.5); the machine tool spindle (2) is controlled to slide up and down along a linear guide rail (1.3) through a linear motor (1.4) and a lead screw (1.5); the swing motor (2.1) is located in a square groove (1.8) of the slanting column feed bed (1), and controls the spindle (2.3) to swing around the slanting column feed bed (1) to ensure that the cutter (2.5) can process a hub (4.1), a blade root (4.4.3) at a blade surface, and a blade root (4.4.4) at a blade back; the spindle motor (2.2) drives the shank (2.4) and the cutter (2.5) to rotate about a first axis of rotation to process the blade root (4.4);

the propeller (4) comprises the hub (4.1), blades (4.3), and the blade root (4.4); the hub (4.1) is used to fix and combine each of the blades (4.3); and the blade root (4.4) is a connector of the blades (4.3) and the hub (4.1);

the vertical slanting column feed bed comprises a slanting column (1.1), a base bed (1.2), the linear guide rail (1.3), the linear motor (1.4), the lead screw (1.5), and the square groove (1.8); a distance (4.5) between two adjacent blades (4.3.1, 4.3.2) of the blades (4.3) is larger than the width (1.6) of the slanting column to ensure that the slanting column (1.1) does not interfere with the blades (4.3) in a feed process; the square groove (1.8) is formed at a first side of the slanting column (1.1) to achieve processing of the propeller (4); an oblique slanting angle (1.7) extends from a longitudinal axis of the slanting column (1.1) to a lower face of the base bed (1.2), and the slanting angle (1.7) of the slanting column is adapted to a deflection angle (4.6) of the blade back; the longitudinal axis of the slanting column (1.1) extends parallel to the linear guide rail (1.3) of the slanting column (1.1), and a height of the slanting column (1.1) cannot be lower than a height of the hub (4.1) to ensure the processing integrity of a top end (4.4.1) and a bottom end (4.4.2) of the blade root;

the workpiece rotary worktable having the second form comprises a circular base (3.1) and a rotary worktable (3.2); wherein the circular base (3.1) plays a supporting role and the circular base (3.1) also provides vibration isolation services for rotation of the propeller (4) about a second axis of rotation; the diameter (3.1.1) of the circular base is larger than the diameter (3.2.1) of the rotary worktable; and an upper surface (3.1.2) of the circular base is lower than a bottom end (1.1.1) of the slanting column (1.1) to ensure that the vertical slanting column feed bed is close to the hub (4.1), thereby effectively reducing an overhang length (2.6) of the spindle; and the gantry type feed mechanism comprises a linear motor (5.1), a lead screw (5.2), guide rails (5.3), worktables (5.4), and columns (5.5); the inverted slanting column feed bed slides on the worktables (5.4) along the guide rails (5.3) through the linear motor (5.1), the lead screw (5.2), and the columns (5.5), as the columns (5.5) are disposed on the guide rails (5.3) and worktables (5.4), and the columns (5.5) support the inverted slanting column feed bed such that the base bed (1.2) extends between said columns (5.5); a distance (5.6) between the columns (5.5) is larger than the diameter (4.9) of the propeller; and a height (5.7) of the columns (5.5) is larger than a total height (4.10) of the propeller to prevent the inverted slanting column feed bed from colliding with a hub cap (4.2) and the blades (4.3) during sliding along the guide rails (5.3).

6. The slanting-bed feed processing machine tool of the propeller according to claim 5, wherein a further groove is formed at a second side of the slanting column (1.1).

7. The slanting-bed feed processing machine tool of the propeller according to claim 5, wherein the hub cap (4.2) is added on a top end of the hub (4.1) of the propeller (4) to reduce water resistance.

* * * * *